(12) United States Patent
Li et al.

(10) Patent No.: US 12,225,261 B2
(45) Date of Patent: Feb. 11, 2025

(54) PICTURE-IN-PICTURE CONTROL INTERFACE

(71) Applicant: ARRIS Enterprises LLC, Suwanee, GA (US)

(72) Inventors: Hongchun Li, Cypress, TX (US); Sean Tran, San Diego, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/125,834

(22) Filed: Mar. 24, 2023

(65) Prior Publication Data
US 2023/0319342 A1 Oct. 5, 2023

Related U.S. Application Data

(60) Provisional application No. 63/324,723, filed on Mar. 29, 2022.

(51) Int. Cl.
H04N 21/43 (2011.01)
H04N 21/431 (2011.01)
H04N 21/443 (2011.01)

(52) U.S. Cl.
CPC ..... *H04N 21/4316* (2013.01); *H04N 21/4438* (2013.01)

(58) Field of Classification Search
None
See application file for complete search history.

(56) References Cited

U.S. PATENT DOCUMENTS

2016/0191980 A1* 6/2016 Yu ............ H04N 21/818 725/40
2017/0085941 A1 3/2017 Gupta et al.

OTHER PUBLICATIONS

International Search Report and Written Opinion issued Jun. 12, 2023 in International Application No. PCT/US2023/016199.
International Preliminary Report on Patentability dated Sep. 24, 2024 in International (PCT) Application No. PCT/US2023/016199.

* cited by examiner

*Primary Examiner* — Samira Monshi
(74) *Attorney, Agent, or Firm* — Wenderoth, Lind & Ponack, L.L.P.

(57) ABSTRACT

An interface of a device can allow a resource to set a location of a PiP window that is different than the default or predetermined location of the PiP window. The device can set a Picture-in-Picture (PiP) window location. The device can receive a PiP window location request that comprises one or more location parameters that indicate a location for display of a PiP window. The device can set the PiP window location based on the one or more location parameters. The device can then send the PiP window location to a PiP control management service. The resource then is able to control the placement of information associated with the resource to provide the user with an improved user experience.

20 Claims, 4 Drawing Sheets

PICTURE-IN-PICTURE CONTROL INTERFACE

BACKGROUND

Generally, picture-in-picture (PiP) provides one program channel (a main program or main resource) displayed on a full screen simultaneously with at least one other program channel (or auxiliary program or other resource) displayed in a viewable inset window. Audio is provided from the main program and the main program can be swapped with the auxiliary program. For devices running an Android operating system, the inset or PiP window is displayed in a predetermined or default location that is not changeable by a selected resource. Thus, there is a need to provide a resource with the ability to set the location of a PiP window for display to be a different location that the original or default location.

SUMMARY

According to aspects of the present invention, an interface allows a resource to set the location of a PiP window that is different from the default or original location set by an Android operating system executing or running on a particular device. Generally, the Android operating system does not permit a resource to change the location of the PiP window (also referred to as the inset window). For a given resource, the default location of the PiP window may not be a strategic or advantageous location. For example, a provider of a resource may want to distinguish the resource from other resources by displaying the PiP window in a location different than the default location. A novel solution provides an interface to the Android operating system that allows a resource to set or change the location of the PiP window, for example, at run-time. In this way, a resource has control over the display of information associated with the resource so as to provide an improved user experience.

An aspect of the present disclosure is drawn to a device that sets a location for a Picture-in-Picture (PiP) window location. The device comprises a memory storing one or more computer-readable instructions, and a processor coupled to the memory. The processor is configured to execute the one or more computer-readable instructions to cause the device to receive a PiP window location request, wherein the PiP window location request comprises one or more location parameters that indicate a location for display of a PiP window, set the PiP window location based on the one or more location parameters, and send the PiP window location to a PiP control management service.

In an aspect of the present disclosure, wherein the one or more location parameters indicate a location different from a default PIP window location.

In an aspect of the present disclosure, the processor is further configured to execute the one or more computer-readable instructions to further cause the device to load a PiP control interface.

In an aspect of the present disclosure, wherein the window location request is associated with a resource.

In an aspect of the present disclosure, the processor is further configured to execute the one or more computer-readable instructions to further cause the device to receive a user input, wherein the user input causes a PiP control interface to be loaded.

In an aspect of the present disclosure, the processor is further configured to execute the one or more computer-readable instructions to further cause the device to receive an additional PiP window location request associated with an additional resource different from a resource associated with the PiP window location request, wherein the additional PiP window location request comprises one or more additional location parameters that indicate a different location for display of an additional PiP window, set the additional PiP window location based on the one or more additional location parameters, and send the additional PiP window location to the PiP control management service.

In an aspect of the present disclosure, wherein the PiP window location comprises any of an indication of a portion of a display screen, a horizontal offset, a vertical offset, or any combination thereof.

An aspect of the present disclosure is drawn to a method for setting a Picture-in-Picture (PiP) window location. The method comprises receiving a PiP window location request, wherein the PiP window location request comprises one or more location parameters that indicate a location for display of a PiP window, setting the PiP window location based on the one or more location parameters, and sending the PiP window location to a PiP control management service.

In an aspect of the present disclosure, the method is such that the one or more location parameters indicate a location different from a default PIP window location.

In an aspect of the present disclosure, the method further comprises loading a PiP control interface.

In an aspect of the present disclosure, the method is such the window location request is associated with a resource.

In an aspect of the present disclosure, the method further comprising receiving a user input, wherein the user input causes a PiP control interface to be loaded.

In an aspect of the present disclosure, the method further comprising receiving an additional PiP window location request associated with an additional resource different from a resource associated with the PiP window location request, wherein the additional PiP window location request comprises one or more additional location parameters that indicate a different location for display of an additional PiP window, setting the additional PiP window location based on the one or more additional location parameters, and sending the additional PiP window location to the PiP control management service.

In an aspect of the present disclosure, the method is such that the PiP window location comprises any of an indication of a portion of a display screen, a horizontal offset, a vertical offset, or any combination thereof.

An aspect of the present disclosure provides a computer readable medium of a device having one or more computer-readable instructions stored thereon. The one or more computer-readable instructions when executed by a processor of the device, cause the device to perform one or more operations including the steps of the methods described herein.

BRIEF DESCRIPTION OF THE DRAWINGS

Like reference numbers and designations in the various drawings indicate like elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
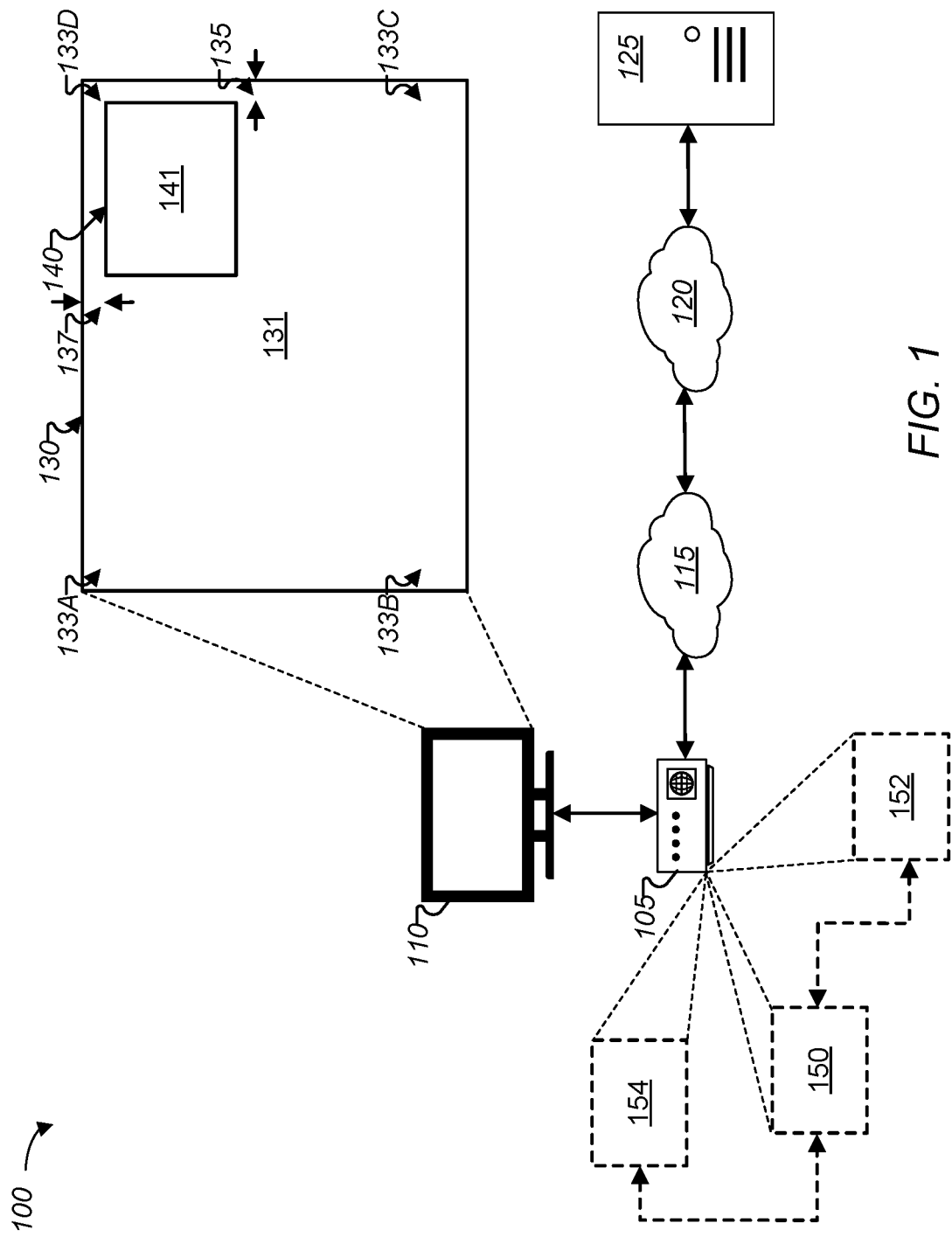
FIG. 1 is a diagram of a network environment operable to facilitate a PiP window being displayed at a location set by a resource, according to one or more aspects of the present disclosure.

FIG. 1 is a diagram of an network environment 100 operable to facilitate a PiP being displayed at a location set by a resource 152, according to one or more aspects of the present disclosure. The network environment 100 comprises a device 105 that executes or otherwise runs an Android operating system 154, a resource 152, and a PiP control interface 150. The resource 152 can be an application that provides an interface to a content provider, such as from a server 125. For example, the resource 152 can comprise any of a Netflix application, an Amazon application, a YouTube application, any other application that provides an interface to a content provider, or any combination thereof.

The device 105 can receive content, for example, at a subscriber premise, and can output received content to a display device 110, for example, any of a television, a monitor, any other screen capable of displaying content, or any combination thereof. In one or more embodiments, the display device 110 is part of or included within the device 105. Device 105 can comprise any of a set-top box, a streaming device, a television, an Internet of Things (IoT) device, any other device capable of causing content to be displayed at a display device 110, or any combination thereof. Content can be delivered to the device 105 over one or more channels through a provider network or Internet service provider (ISP) 115 (for example, hybrid fiber-coaxial network, fiber network, cellular network, high speed data network, etc.). Content can be provided by a wide-area network (WAN) 120, and a headend device may format and package 115. For example, content (such as real-time content, linear, Internet) associated with a channel can be delivered to the device 105 over a specific frequency and/or wavelength/Internet protocol associated with the channel. The content can be provided from a server 125 to the device 105 via the WAN 120 and ISP 115.

The display device 110 comprises a display 130 that displays content, for example, a content 131 (such as from a first channel). The display screen 130 can comprise a plurality of locations 133, for example, a first location 133A at an upper left portion of the display screen 130, a second location 133B at a lower left portion of the display screen 130, a third location 133C at a lower right portion of the display screen 130, and a four location 133D at an upper right portion of the display screen 130. While FIG. 1 illustrates four locations 133A-D (collectively referred to as locations 133) for display of a PiP window 140, the present disclosure contemplates that any number of locations 133 can be utilized or otherwise provided for display of the PiP window 140. The display device 110 can display a PiP window 140 that displays a second content 141 (such as a second channel). The Android operating system 154 causes the PiP window 140 to be displayed at the default location, for example, at an upper right portion (a fourth location 133D) of the display screen 130. The PiP control interface 150 allows a resource 152 to override or otherwise change the location 133 of the PiP window 140 to a different location 133, such as to a location different from the default location 133D, for example, by providing an interface to the Android operation system 154. The PiP control interface 150 can also allow a resource 152 to select any of a horizontal offset 135, a vertical offset 137, or both that the PiP window 140 is offset from the edge of the display screen 130, a location 133, or any combination thereof.

While FIG. 1 illustrates various devices, the present disclosure contemplates any number of devices within the access network environment 100.

Figure 2:
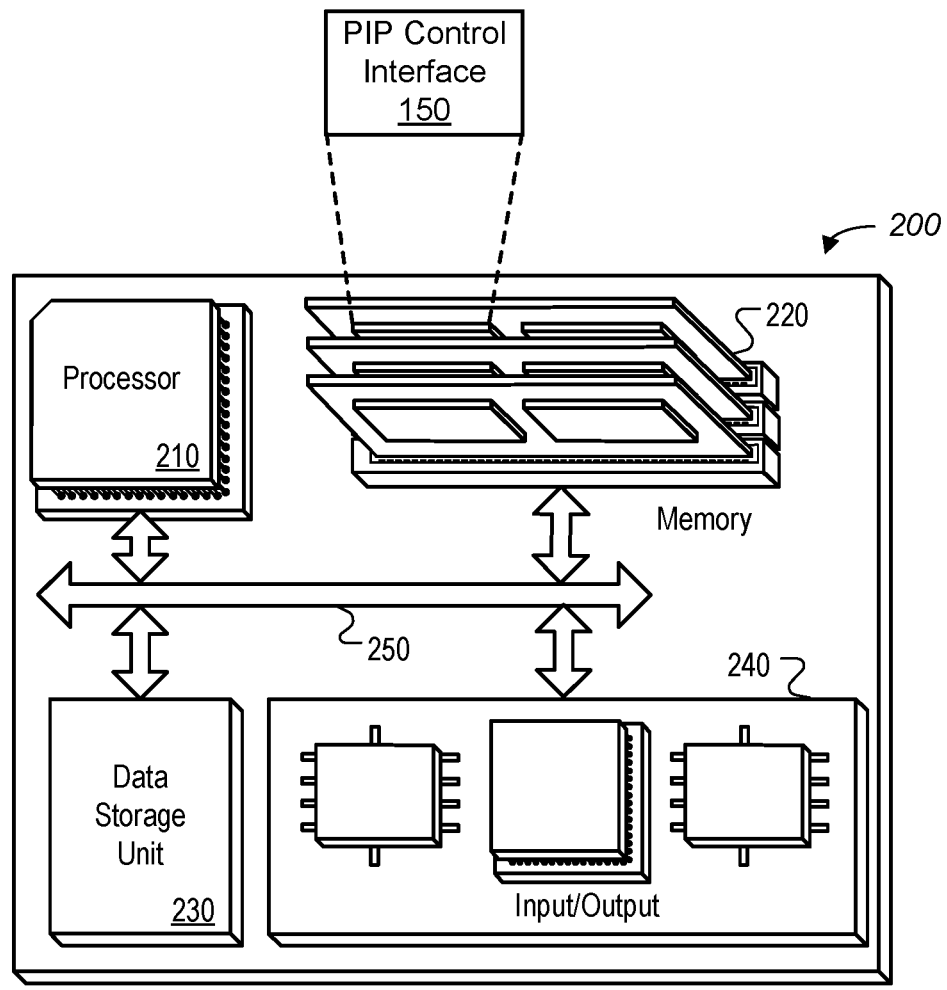
FIG. 2 is a block diagram of a hardware configuration for one or more devices, according to one or more aspects of the present disclosure.

FIG. 2 is a block diagram of a hardware configuration 200 for one or more devices 105 within a network environment 100. The hardware configuration 200 can comprise a processor 210, a memory 220, a storage device or data storage unit 230, and an input/output (I/O) device 240. Each of the components 210, 220, 230, and 240 can, for example, be interconnected using a system bus 250. The processor 210 can be capable of processing one or more computer-readable instructions for execution within the hardware configuration 200. In one or more embodiments, the processor 210 can be a single-threaded processor. In one or more embodiments, the processor 210 can be a multi-threaded processor. The processor 210 can be capable of processing one or more computer-readable instructions stored in the memory 220 and/or on the data storage unit or storage device 230. In one or more embodiments, a PiP Control Interface 150 is stored in the memory 220.

The memory 220 can store information within the hardware configuration 200, for example, a software such as PiP control interface 150. In one implementation, the memory 220 can be a computer-readable medium that stores one or more computer-readable instructions that when executed by a processor 210 cause the device to perform one or more operations according to one or more aspects of the present disclosure. In one implementation, the memory 220 can be a volatile memory unit. In another implementation, the memory 220 can be a non-volatile memory unit. In one or more embodiments, the storage device 230 can be capable of providing mass storage for the hardware configuration 200. In one implementation, the data storage unit 230 can be a computer-readable medium. In various different implementations, the data storage unit 230 can, for example, include a hard disk device, an optical disk device, flash memory or some other large capacity storage device. In other implementations, the data storage unit 230 can be a device external to the hardware configuration 200.

The I/O device 240 provides I/O operations for the hardware configuration 200. In one implementation, the I/O device 240 can include one or more of a network interface device (for example, an Ethernet card), a serial communication device (for example, an RS-232 port), one or more universal serial bus (USB) interfaces (for example, a USB 2.0 port), one or more wireless interface devices (for example, an 802.11 card) for outputting video, voice, and/or data services to a device 105 of FIG. 1 (for example, television, STB, computer, mobile device, tablet, telephone, wearable, etc.). As an example, the I/O device 240 can include one or more driver devices configured to send communications to, and receive communications from one or more networks and/or one or more network devices.

Figure 3:
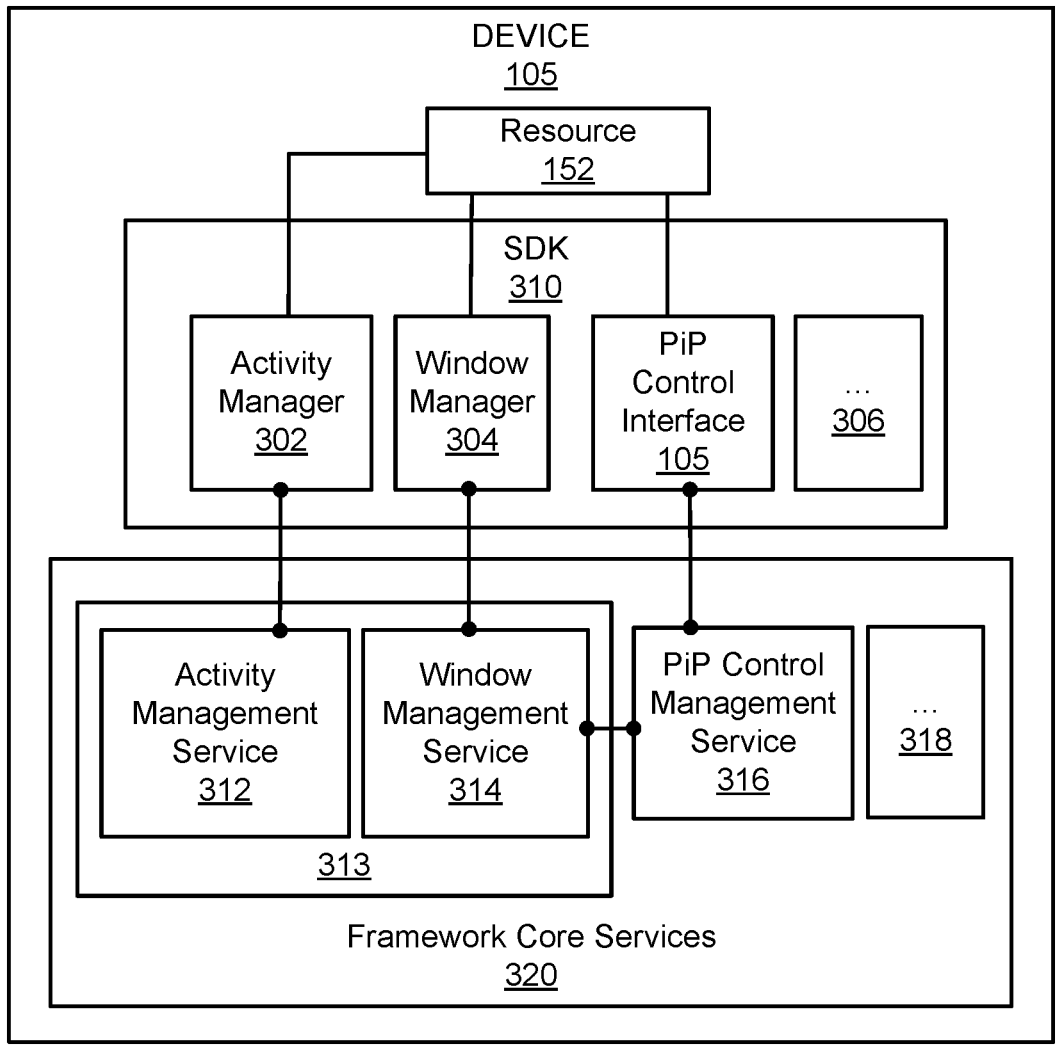
FIG. 3 is a block diagram of a device for setting a location of a PiP window, according to one or more aspects of the present disclosure.

FIG. 3 is a block diagram of a device 105 for setting a location of a PiP window 140, for example, for display on a display device 110, according to one or more aspects of the present disclosure. The device 105 can comprise a resource 152, a software development kit (SDK) 310, and a framework core services 320, for example, stored in a memory 220 of the device 105. The SDK 310 comprises an activity manager 302, a window manager 304, a PiP control interface 105, and one or more other managers 306.

The resource 152 is communicatively coupled to one or more elements of the SDK 310. For example, the resource 152 communicates with the activity manager 302. Activity manager 302 comprises an Android class that provides information about as well as interacts with, one or more activities, one or more services and/or one or more containing processes and is an Android API reference:
    public class ActivityManager
    extends Object
    java.lang.Object
        android.app.ActivityManager The resource 152 communicates with the window manager 304. The window manager 302 comprises an Android class that provides to one or more resources 152 an interface for managing one or more windows so as to handle a screen layout and interaction with a user and is an Android API reference:
    public interface WindowManager
    implements ViewManager
    android.view.WindowManager The resource 152 communicates with the PiP control interface 105. The PiP Control Interface 105 comprises an interface that provides to one or more resources 152 the ability to set a location of a PiP window 140. For example, a resource 152 can send a PiP window location request to the PiP control interface 105 to set a location of a PiP window 140. The request can comprise one or more location parameters. The one or more location parameters can identify or otherwise indicate any of one or more coordinates, one or more portions, one or more areas, or any combination thereof associated with location for display of a PiP window 140.

The framework core services 320 is an Android operating system low level management layer that comprises a PiP control management service 316, one or more other services 318, an activity management service 312 and a window management service 314. The activity manager 302 communicates with the activity management service 312. The activity management service 312 manages a plurality of activities. The window manager 304 communicates with the window management service 314 that manages graphics associated with a window.

The PiP control interface 105 communicates with a PiP control management service 316, for example, so as to provide one or more location parameters. The PiP control management service 316 communicates the one or more location parameters to the window management service 314 and activity management service 312 so as to cause the PiP window to be displayed at a display device based on the one or more location parameters.

Figure 4:
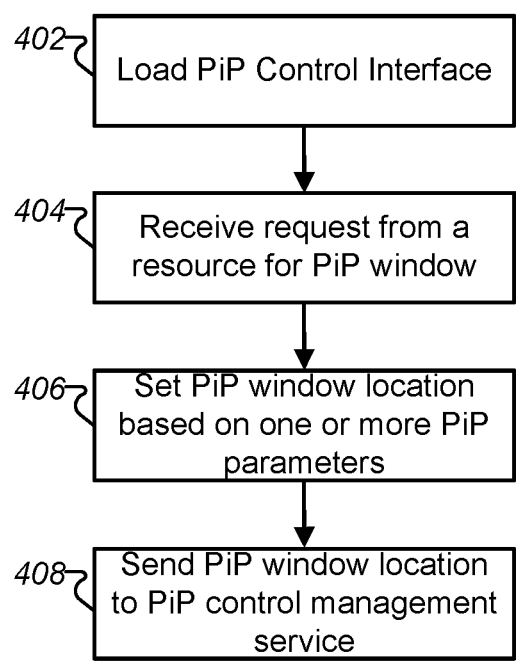
FIG. 4 is a flowchart for a method of setting a location of a PiP window, according to one or more aspects of the present disclosure.

FIG. 4 is a flowchart for setting a location of a PiP window, according to one or more aspects of the present disclosure. In FIG. 4, it is assumed that any one or more devices 105 include their respective controllers and/or processors and their respective software (such as one or more computer-readable instructions) stored in their respective memories, as discussed above in reference to FIGS. 1-3, which when executed by their respective controllers perform one or more functions or operations in accordance with the example embodiments of the present disclosure.

The processor 210 executes one or more computer-readable instructions, stored in a memory, for example, a memory 220 of an access point device 110, that when executed by the processor 210 perform and/or cause the device 105 to perform one or more of the operations of steps 402-408. In one or more embodiments, the one or more computer-readable instructions may be one or more software applications. While the steps 402-408 are presented in a certain order, the present disclosure contemplates that any one or more steps can be performed simultaneously, substantially simultaneously, repeatedly, in any order or not at all (omitted).

At step 402, the PiP control interface 150 is loaded or otherwise initiated. For example the PiP control interface 150 can be loaded based on a user input, such as when a user input is received at a remote control device associated with the device 105 that indicates a PiP window is requested to be displayed.

At step 404, the PiP control interface 150 receives from a resource 152 a PiP window location request from a resource 152. The PiP window location request comprises one or more location parameters. The one or more location parameters indicate a location on a display screen 130 of a display device 110 for display of the PiP window 140. For example, a resource 152 can be a Netflix app that requests a PiP window 140 be displayed at a customized location that is different than the default PiP window location. For example, the one or more location parameters can indicate a location on the display screen 130 different from the default PiP window location.

At step 406, the PiP control interface 150 sets a PiP window location based on the request from the resource 152, for example, based on the one or more location parameters received as part of or associated with the request. The PiP window location can comprise an indication of a portion 133, for example, of a display screen 130, a horizontal offset 135, a vertical offset 137, or any combination thereof. For example, the PiP control interface 150 can convert the one or more location parameters to a format required by the window management service 314.

At step 408, the PiP control interface 150 sends the PiP window location to the PiP control management service 316. The PiP control management service 316 interfaces with a window management service 314 to so as to cause the display of the PiP window at the PiP window location on a display screen 130, for example, by communication the PiP window location to a window manager 304. In one or more embodiments, window management service 314 requests one or more location parameters and/or PiP window location from the PiP control management service 316. If the one or more location parameters and/or PiP window location is received in response then the window management service 314 causes the PiP window to be displayed at the one or more location parameters and/or PiP location and if not, the window management service 314 will cause the PiP window to be displayed at a default or predetermined location.

In one or more embodiments, an additional PiP window location request can be received from a different resource 152 of a plurality of resources 152. The additional PiP window location request can comprise one or more additional location parameters associated with the additional PiP window location request that indicate a location for display of a PiP window associated with the different resource 152. In this way, any of a plurality of resources 152 can have an associated one or more location parameters so as to enable a display of an associated PiP window at a customized location. For example, a first resource can be associated with a first one or more location parameters associated with a first PiP window and a second resource can be associated with a second one or more location parameters associated with a second PiP window such that the first one or more location parameters indicate a first location that is different from a second location indicated by the second one or more location parameters. As an example, the first PiP window can be displayed on the display screen 130 at a first location 133A based on the first one or more location parameters and the second PiP window can be displayed on the display screen at a second location 133C based on the second one or more location parameters.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication or access network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A device for setting a Picture-in-Picture (PiP) window location, the device comprising:
   a memory storing one or more computer-readable instructions; and
   a processor coupled to the memory, the processor configured to execute the one or more computer-readable instructions stored on the memory to cause the device to:
   load a PiP control interface of the device based on a user input;
   receive, at the PiP control interface, a PiP window location request from a resource of the device, wherein the PiP window location request comprises one or more location parameters that indicate a location for display of a PiP window, and wherein the resource provides an interface to a content provider;

set, by the PiP control interface, the PiP window location based on the PiP window location request that comprises the one or more location parameters, wherein the setting the PiP window location comprises converting the one or more location parameters to a format required by a window management service of a framework core services of the device;

send, by the PiP control interface, the PiP window location to a PiP control management service of the framework core services; and communicate, by the PiP control management service, the PiP window location to the window management service to cause display of the PiP window on a display screen.

2. The device of claim 1, wherein the one or more location parameters indicate a location different from a default PIP window location.

3. The access point device of claim 1, wherein the PiP control interface allows the resource to override or change the PiP window location to a different location from a default location.

4. The access point device of claim 1, wherein the resource comprises an application.

5. The access point device of claim 4, wherein the processor is further configured to execute the one or more computer-readable instructions to further cause the device to:
receive the user input, wherein the user input is received from a remote control device associated with the device.

6. The access point device of claim 1, wherein the processor is further configured to execute the one or more computer-readable instructions to further cause the device to:
receive an additional PiP window location request associated with an additional resource different from a resource associated with the PiP window location request, wherein the additional PiP window location request comprises one or more additional location parameters that indicate a different location for display of an additional PiP window;
set the additional PiP window location based on the one or more additional location parameters; and
send the additional PiP window location to the PiP control management service.

7. The access point device of claim 1, wherein the PiP window location comprises any of an indication of a portion of a display screen, a horizontal offset, a vertical offset, or any combination thereof.

8. A method for setting a Picture-in-Picture (PiP) window location, the method comprising:
loading a PiP control interface of the device based on a user input;
receiving, at the PiP control interface, a PiP window location request from a resource of the device, wherein the PiP window location request comprises one or more location parameters that indicate a location for display of a PiP window, and wherein the resource provides an interface to a content provider;
setting, by the PiP control interface, the PiP window location based on the PiP window location that comprises the one or more location parameters, wherein the setting the PiP window location comprises converting the one or more location parameters to a format required by a window management service of a framework core services of the device;
sending, by the PiP control interface, the PiP window location to a PiP control management service of the framework core services; and
communicating, by the PiP control management service, the PiP window location to the window management service to cause display of the PiP window on a display screen.

9. The method of claim 8, wherein the one or more location parameters indicate a location different from a default PIP window location.

10. The method of claim 8,
the PiP control interface allows the resource to override or change the PiP window location to a different location from a default location.

11. The method of claim 8, wherein the window location request is associated with a resource comprises an application.

12. The method of claim 11, further comprising:
receiving the user input, wherein the user input is received from a remote control device associated with the device.

13. The method of claim 8, further comprising:
receiving an additional PiP window location request associated with an additional resource different from a resource associated with the PiP window location request, wherein the additional PiP window location request comprises one or more additional location parameters that indicate a different location for display of an additional PiP window;
setting the additional PiP window location based on the one or more additional location parameters; and
sending the additional PiP window location to the PiP control management service.

14. The method of claim 8, wherein the PiP window location comprises any of an indication of a portion of a display screen, a horizontal offset, a vertical offset, or any combination thereof.

15. A non-transitory, computer-readable medium of a device storing one or more computer-readable instructions that when executed by a processor of the device, cause the device to perform one or more operations comprising:
loading a PiP control interface of the device based on a user input;
receiving, at the PiP control interface, a PiP window location request from a resource of the device, wherein the PiP window location request comprises one or more location parameters that indicate a location for display of a PiP window, and wherein the resource provides an interface to a content provider;
setting, by the PiP control interface, the PiP window location based on the PiP window location that comprises the one or more location parameters, wherein the setting the PiP window location comprises converting the one or more location parameters to a format required by a window management service of a framework core services of the device;
sending, by the PiP control interface, the PiP window location to a PiP control management service of the framework core services; and
communicating, by the PiP control management service, the PiP window location to the window management service to cause display of the PiP window on a display screen.

16. The non-transitory, computer-readable medium of claim 15, wherein the one or more location parameters indicate a location different from a default PIP window location.

17. The non-transitory, computer-readable medium of claim 15, wherein the PiP control interface allows the resource to override or change the PiP window location to a different location from a default location.

18. The non-transitory, computer-readable media of claim 15, wherein at least one of:
   the window location request is associated with the resource that comprises an application; and
   the PiP window location comprises any of an indication of a portion of a display screen, a horizontal offset, a vertical offset, or any combination thereof.

19. The non-transitory computer-readable media of claim 15, wherein the one or more computer-readable instructions when executed by the processor, further cause the processor to perform the one or more operations further comprising:
   receiving the user input, wherein the user input is received from a remote control device associated with the device.

20. The non-transitory computer-readable media of claim 15, wherein the one or more computer-readable instructions when executed by the processor, further cause the processor to perform the one or more operations further comprising:
   receiving an additional PiP window location request associated with an additional resource different from a resource associated with the PiP window location request, wherein the additional PiP window location request comprises one or more additional location parameters that indicate a different location for display of an additional PiP window;
   setting the additional PiP window location based on the one or more additional location parameters; and
   sending the additional PiP window location to the PiP control management service.

\* \* \* \* \*